(12) United States Patent
Tamayo et al.

(10) Patent No.: US 12,732,578 B2
(45) Date of Patent: Sep. 8, 2026

(54) INTERACTIVE CALLING ASSISTANCE SYSTEM WITH ARTIFICIAL INTELLIGENCE

(71) Applicant: Capital One Services, LLC, McLean, VA (US)

(72) Inventors: Bryan Tamayo, Allen, TX (US); Bailey Beaudo, Richardson, TX (US)

(73) Assignee: Capital One Services, LLC, McLean, VA (US)

( * ) Notice: Subject to any disclaimer, the term of this patent is extended or adjusted under 35 U.S.C. 154(b) by 174 days.

(21) Appl. No.: 18/392,819

(22) Filed: Dec. 21, 2023

(65) Prior Publication Data

US 2025/0211675 A1 Jun. 26, 2025

(51) Int. Cl.

| | |
|---|---|
| ***H04M 3/42*** | (2006.01) |
| ***G10L 15/26*** | (2006.01) |
| ***G10L 25/63*** | (2013.01) |
| ***H04M 3/22*** | (2006.01) |

(52) U.S. Cl.

CPC ........... *H04M 3/4217* (2013.01); *G10L 15/26* (2013.01); *G10L 25/63* (2013.01); *H04M 3/2227* (2013.01)

(58) Field of Classification Search

None

See application file for complete search history.

(56) References Cited

U.S. PATENT DOCUMENTS

| | | | |
|---|---|---|---|
| 8,990,090 B1 | 3/2015 | Pettay | |
| 9,037,470 B1 | 5/2015 | Pettay et al. | |
| 10,708,424 B1 * | 7/2020 | Maestas | H04M 3/5141 |
| 11,601,552 B2 | 3/2023 | Scodary et al. | |
| 11,706,337 B1 * | 7/2023 | Mitchem | G06F 40/30 704/270.1 |
| 2019/0355042 A1 * | 11/2019 | Swierk | G06Q 30/016 |
| 2021/0201916 A1 * | 7/2021 | Touret | H04M 3/42102 |
| 2022/0051664 A1 * | 2/2022 | Baror | G06F 16/90332 |
| 2024/0412029 A1 * | 12/2024 | Yang | G06N 3/0475 |

* cited by examiner

*Primary Examiner* — Antim G Shah

(74) *Attorney, Agent, or Firm* — Harrity & Harrity, LLP

(57) ABSTRACT

In some implementations, a system may receive a request for a calling session associated with a topic. The system may establish the calling session between a user device with a first user interface and a client device with a second user interface, wherein the second user interface is provide with first assistance information associated with the topic. The system may monitor multimedia communications associated with the calling session. The system may detect a request for protected information. The system may determine that the protected information satisfies a threshold security level. The system may transmit an instruction to cause a user interface element to be provided for display via the first user interface based on determining that the protected information satisfies the threshold security level. The system may receive the protected information via a message indicating an interaction with the user interface element.

18 Claims, 11 Drawing Sheets

INTERACTIVE CALLING ASSISTANCE SYSTEM WITH ARTIFICIAL INTELLIGENCE

BACKGROUND

A calling server may connect calls between different devices. For example, a calling server may receive a request to connect a call from a user device and may connect the call to a client device. The call may include a textual component, an audio component, and/or a video component. Some calling servers may provide assistance features, such as transcription (e.g., using speech-to-text functionalities), a screen-sharing mode, or a presentation mode. Calling servers may be used for one-on-one calling, group meetings, or customer service assistance, among other examples.

SUMMARY

Some implementations described herein relate to a system for interactive calling. The system may include one or more memories and one or more processors communicatively coupled to the one or more memories. The one or more processors may be configured to receive a request for a calling session associated with a topic. The one or more processors may be configured to establish the calling session between a user device with a first user interface and a client device with a second user interface, wherein the second user interface is provided with first assistance information associated with the topic. The one or more processors may be configured to monitor, based on establishing the calling session, multimedia communications associated with the calling session. The one or more processors may be configured to detect, based on monitoring the multimedia communications associated with the calling session, an event associated with the calling session. The one or more processors may be configured to identify, using an artificial intelligence model, second assistance information to serve to at least one of the user device or the client device based on detecting the event. The one or more processors may be configured to transmit user interface information to the at least one of the user device or the client device to cause a respective user interface to provide the second assistance information for display.

Some implementations described herein relate to a method for interactive calling. The method may include receiving, by a system, a request for a calling session associated with a topic. The method may include establishing, by the system, the calling session between a user device with a first user interface and a client device with a second user interface, wherein the second user interface is provided with first assistance information associated with the topic. The method may include monitoring, based on establishing the calling session, multimedia communications associated with the calling session. The method may include detecting, based on monitoring the multimedia communications associated with the calling session, a request for protected information. The method may include determining, by the system, that the protected information satisfies a threshold security level. The method may include transmitting, by the system, an instruction to cause a user interface element to be provided for display via the first user interface based on determining that the protected information satisfies the threshold security level. The method may include receiving, by the system, the protected information via a message indicating an interaction with the user interface element.

Some implementations described herein relate to a non-transitory computer-readable medium that stores a set of instructions. The set of instructions, when executed by one or more processors of a system, may cause the system to receive a request for a calling session associated with a topic. The set of instructions, when executed by one or more processors of the system, may cause the system to identify a quality assurance (QA) checklist associated with the topic. The set of instructions, when executed by one or more processors of the system, may cause the system to establish the calling session between a user device with a first user interface and a client device with a second user interface, wherein the second user interface is provided with the QA checklist. The set of instructions, when executed by one or more processors of the system, may cause the system to monitor, based on establishing the calling session, progression through the QA checklist associated with the calling session. The set of instructions, when executed by one or more processors of the system, may cause the system to detect, based on monitoring the progression through the QA checklist, an event associated with the calling session. The set of instructions, when executed by one or more processors of the system, may cause the system to identify, using an artificial intelligence model, assistance information to serve to at least one of the user device or the client device based on detecting the event. The set of instructions, when executed by one or more processors of the system, may cause the system to transmit user interface information to the at least one of the user device or the client device to cause a respective user interface to provide the assistance information for display.

DETAILED DESCRIPTION

Figure 1A:
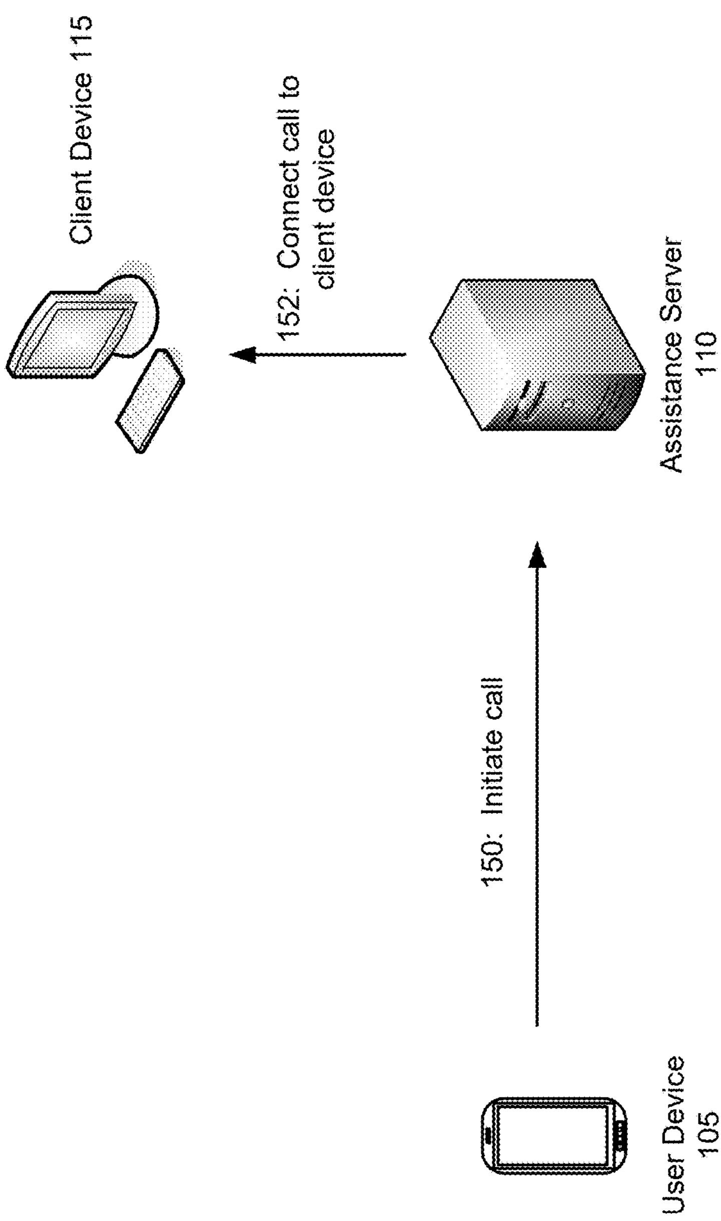
FIGS. 1A-1H are diagrams of an example implementation associated with interactive calling assistance system with artificial intelligence, in accordance with some embodiments of the present disclosure.

The following detailed description of example implementations refers to the accompanying drawings. The same reference numbers in different drawings may identify the same or similar elements.

A user device may call a client device (e.g., via a calling server) to enable a first user of the user device to communicate with a second user of the client device. For example, a first user of a service may use a user device to communicate with a second user associated with providing the service and using a client device. As an example, a cell phone user may communicate with a technical support representative to receive assistance in resolving an error with the user's cell phone. As another example, a patient may communicate with a doctor to receive telemedicine services. As another example, a purchaser of an automobile may communicate with a lender to obtain a loan for purchasing the automobile. In these examples, an audio call may facilitate an exchange of information.

Some of the information that is exchanged during such audio calls may be private information. For example, a user may provide personal identification information, such as a username and password, a social security number, or a date of birth. Additionally, or alternatively, a user may provide protected healthcare information, such as information identifying one or more healthcare conditions or information identifying healthcare measurements that are being performed (e.g., a blood pressure or heart rate). Additionally, or alternatively, a user may provide private financial information, such as banking information or a credit card number. Such information may be overheard by people within a proximity of either party to a call or may be intercepted by malicious entities.

Furthermore, some calls may be associated with established information flows. In an established information flow, one party to a call (e.g., a customer service agent) may use, for example, a checklist to gather information that is relevant to the call. However, in real communications, users may provide information that is to be gathered for a checklist at times outside of a predicted flow of information. In other words, a first person may initiate a call by saying "Hello, my name is John Smith and I have a problem with my Company X laptop computer freezing up," which may provide multiple items of information that could be included in a checklist for information gathering (e.g., who is calling, why are they calling, what particular problem are they experiencing, what hardware are they using that is causing the problem). Accordingly, when a second person is presented with a static checklist for information gathering, calls may be excessively long as redundant questions are asked, which results in excessive utilization of, for example, network resources.

Some implementations described herein enable artificial intelligence (AI) assistance for calling. For example, an assistance server may perform call transcription and dynamically perform sentiment analysis and information flow updating via a user interface of a client device used by a party to a call. As a result, the assistance server can minimize an amount of time on a call to complete an information flow (e.g., to gather or provide information), thereby reducing an amount of time on the call. Some implementations described herein enable multi-channel communication for calling. For example, an assistance server may detect events associated with a call and provide user interface elements for providing or receiving information. As a particular example, when the assistance server detects that a party to a call is to provide secure information, the assistance server may serve a user interface element, via the party's user device. In this case, the user interface element is configured to receive the secure information and provide the secure information via a secure connection (e.g., using end-to-end encryption). As a result, the assistance server can improve a level of security associated with a call, thereby reducing risks of identifying theft, inadvertent disclosure of personal information, or compliance violations associated with handling of secure information.

FIGS. 1A-1H are diagrams of an example implementation 100 associated with interactive calling assistance system with artificial intelligence. As shown in FIGS. 1A-1H, example implementation 100 includes a user device 105, an assistance server 110, a client device 115, and a data server 120. These devices are described in more detail below in connection with FIG. 2 and FIG. 3.

As shown in FIG. 1A, and by reference number 150, the assistance server 110 may receive, from the user device 105, a request to initiate a call. For example, the assistance server 110 may receive a request to initiate a call for technical support, customer service, telemedicine, or another type of call. In some implementations, the assistance server 110 may receive a request to initiate a particular format of call. For example, the assistance server 110 may receive a request to initiate a multimedia call that includes one or more of an audio call component, a video call component, a virtual reality call component, or a textual call component. In some implementations, the call may be a particular type of call. For example, the assistance server 110 may receive a request to connect a voice over Internet Protocol (VOIP) call, a video call, or a telephone call, among other examples.

As further shown in FIG. 1A, and by reference number 152, the assistance server 110 may connect the call to the client device 115. For example, the assistance server 110 may identify a client device 115 to which to connect the call with the user device 105. In some implementations, the assistance server 110 may connect the call based on information included in the request for the call. For example, the request for the call may include information identifying the client device 115, such as a ticket number associated with a user of the client device 115. Additionally, or alternatively, the assistance server 110 may connect the call based on information derived regarding a user of the user device 105, such as location information, device information, or service information, among other examples.

Figure 1B:
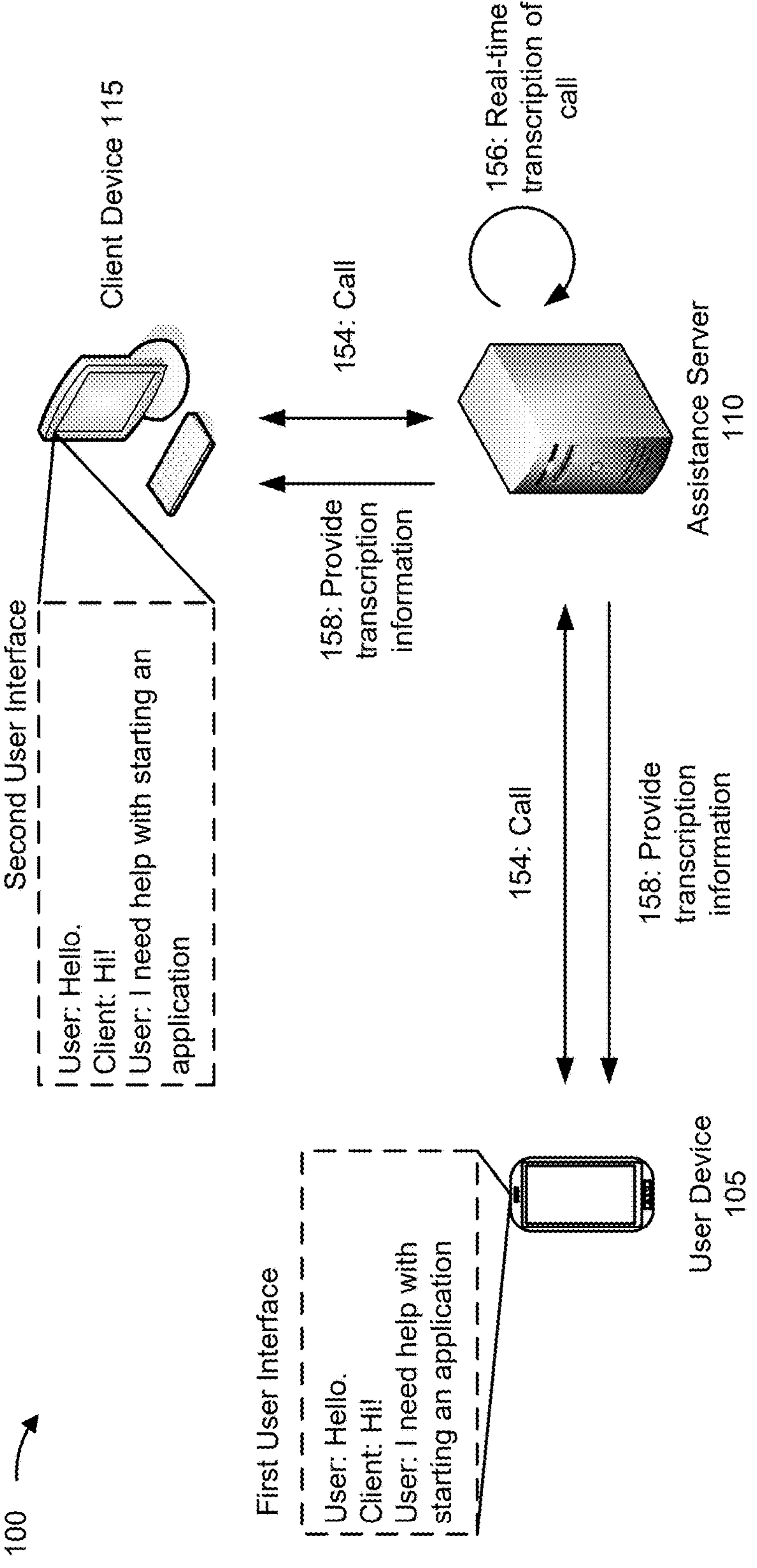

As shown in FIG. 1B, and by reference numbers 154 and 156, the assistance server 110 may monitor the call and perform real-time transcription of the call. For example, the assistance server 110 may monitor the call and use a speech-to-text functionality to perform transcription of the call. In this case, the assistance server 110 may use the generated transcription as an input to one or more machine learning models analyzing the call, such as a sentiment analysis model (e.g., to determine a user sentiment), a semantic analysis model (e.g., to determine a subject or content of the call), or another type of artificial intelligence model. In some implementations, the assistance server 110 may perform sentiment analysis based on the transcription of the call. For example, the assistance server 110 may feed the transcription of the call into an artificial intelligence model for sentiment analysis and generate a sentiment analysis value as an output. Additionally, or alternatively, the assistance server 110 may feed other multimedia information into an artificial intelligence model, such as tonal information (e.g., identifying a tone of voice in an audio call), gesture information (e.g., identifying gestures being made in a video call), user information (e.g., user data, such as purchase information or demographic information), health information (e.g., identifying a heart rate or body temperature collected via sensors of the user device 105), or another type of information. By using tonal information, gesture information, user information, and/or health information, the assistance server 110 may increase an accuracy of a sentiment analysis.

As further shown in FIG. 1B, and by reference number 158, the assistance server 110 may provide transcription information associated with the call. For example, the assistance server 110 may transmit information identifying a transcription of the call and cause the transcription to be provide for display via the user device 105 and/or the client device 115. By performing transcription of the call, the assistance server 110 improves call accessibility, such as for individuals who are deaf or use teletypewriter (TTY) relay services (or other accessibility services). Additionally, or alternatively, the assistance server 110 may transmit information identifying one or more recommendations relating to the transcription for display via the user interface, as described in more detail herein. By providing a user interface element (e.g., to display the transcription or to provide or receive information, as described in more detail herein), the assistance server 110 improves call engagement, thereby reducing a likelihood of the call being prematurely dropped and later restarted, which can waste system and organizational resources.

Figure 1C:
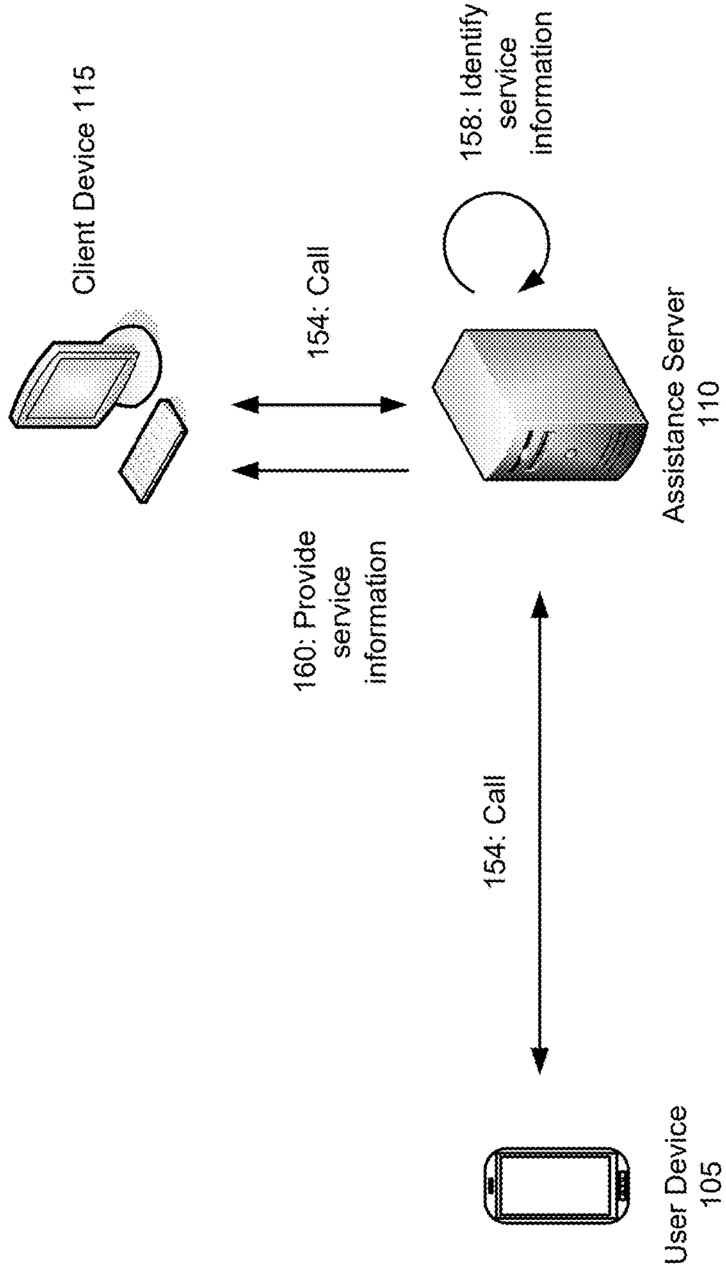
Figure 1C:

As shown in FIG. 1C, and by reference number 158, the assistance server 110 may identify service information. For example, the assistance server 110 may identify a service being provided via the call. In this case, the assistance server 110 may identify an information flow associated with the service and may generate service information identifying the information flow. For example, when the call is associated with technical support, the assistance server 110 may identify a set of questions that a technical support representative is to ask a user to ascertain and resolve an issue. Additionally, or alternatively, the assistance server 110 may identify a set of recommendations for resolving the issue based on the call. In another example, when the call is associated with a telemedicine appointment, the assistance server 110 may identify a set of diagnostic tests that are to be performed (e.g., using connected medical devices or components, such as a blood pressure monitor peripheral or a heart rate monitor peripheral connected to the user device 105. In another example, when the call is associated with an automobile loan, the assistance server 110 may identify a set of fields that are to be completed for requesting that a loan be issued, such as fields identifying a type of vehicle, a price, or a credit score of a user, among other examples.

As further shown in FIG. 1C, and by reference number 160, the assistance server 110 may provide the service information. For example, the assistance server 110 may transmit an instruction to cause a user interface element to be provided for display via a user interface (e.g., of the client device 115 or the user device 105). In this case, the assistance server 110 may analyze the call to automatically identify answers to, for example, questions on a checklist and feed new questions for the checklist to one or more parties to the call. In some implementations, the assistance server 110 may traverse complex decision trees to determine questions to provide as prompts. For example, the assistance server 110 may use a decision-tree type of artificial intelligence (AI) model to efficiently obtain information for providing a service associated with the call. In some implementations, the assistance server 110 may generate questions for the call using an AI model. For example, the assistance server 110 may use semantic analysis to automatically generate one or more questions associated with identifying a technical support problem and resolving the technical support problem, thereby enabling efficient completion of calls. Additionally, or alternatively, the assistance server 110 may automatically fill in one or more forms based on a conversation occurring on a call. For example, the assistance server 110 may automatically fill out a healthcare intake form or a loan request form using information obtained in the call, thereby obviating a need for manual, error-prone form filling.

Figure 1D:
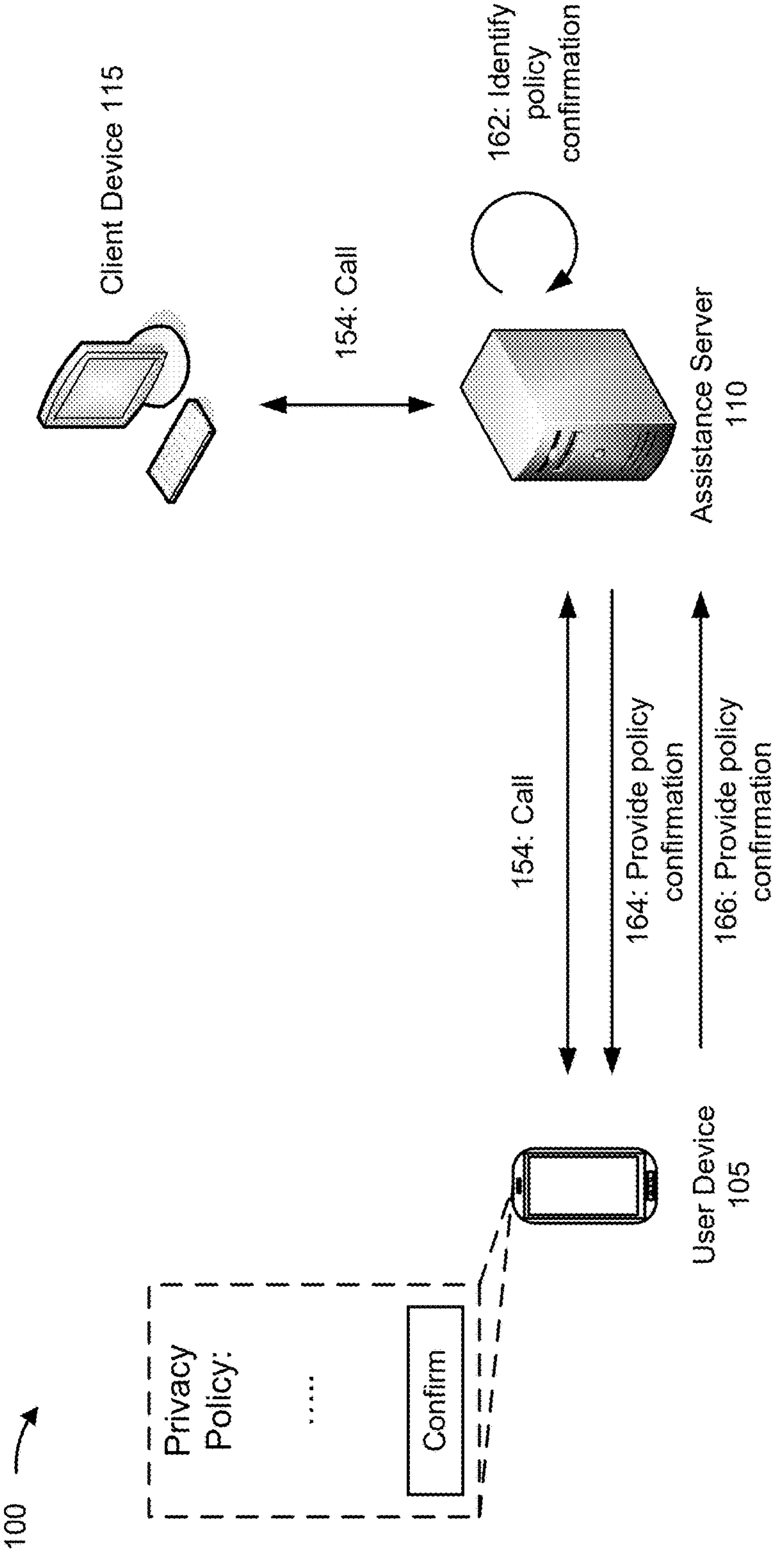

As shown in FIG. 1D, and by reference number 162, the assistance server 110 may identify a policy confirmation. For example, the assistance server 110 may detect an event in a call and determine that the event is associated with a policy confirmation. In this case, the assistance server 110 may parse a transcription of the call to determine, for example, that the call has reached a policy confirmation in an information flow associated with a service of the call. A policy confirmation may include a portion of a call in which a party to the call is requested to confirm information. For example, one party may read a set of disclaimers to another party for confirmation. Here, the assistance server 110 may automatically detect that the call has reached the policy confirmation and provide the policy confirmation via a user interface element, as shown by reference number 164, for confirmation by a user of the user device 105, as shown by reference number 166.

Other types of interactive events are contemplated, such as requests for information, requests to review documentation, or requests to provide an electronic signature, among other examples. For example, the assistance server 110 may monitor a call to synchronize completion of an information flow (e.g., a quality assurance (QA) checklist or QA template) with the call (e.g., by monitoring the call to determine whether questions of the QA checklist or QA template have been answered. In this case, the assistance server 110 may provide a user interface element identifying a detected position within the QA checklist or QA template to enable a user of the client device 115 to follow the QA checklist or QA template more rapidly (e.g., by obviating a need for call breaks to manually fill in or check off elements of the QA checklist or QA template). In some implementations, the assistance server 110 may detect a deviation from a QA checklist or QA template. For example, the assistance server 110 may determine that a user of the client device 115 has skipped a question or has deviated on a conversational tangent. In this case, the assistance server 110 may transmit additional assistance information to identify a corrective instruction, such as an instruction to return to a missed question or a script to return to the QA checklist or QA template.

During completion of the QA checklist or QA template an event may occur, such as an event that includes providing or receiving information. In such an example, the assistance server 110 may detect an occurrence of an event and serve an associated user interface element to enable completion of the event. For example, the assistance server 110 may provide a user interface element to display a policy, as described above, or to receive secure information, as described below. By providing the user interface element, the assistance server 110 may reduce an amount of time for completion of the interactive event, thereby reducing a duration of a call. Across hundreds, thousands, or millions of calls, such duration reductions can result in significant savings of network resources, processing resources, or energy resources, among other examples.

In a particular example, when the assistance server 110 detects an event associated with providing secure information, such as a request for a credit card number, a username and password, a social security number, a result of a healthcare diagnostic test, or another event, the assistance server 110 may provide a user interface element, via a user interface of, for example, the user device 105 with which to receive and/or provide the secure information. Accordingly, the user device 105 may receive input, such as keyboard input or biometric input, associated with identifying the secure information and may transmit the secure information to the assistance server 110 for dissemination to the client device 115. In this way, by using a user interface element, the assistance server 110 can avoid security risks associated with providing the secure information out loud and/or via an unsecure call. For example, the assistance server 110 may provide end-to-end encryption on information provided via the user interface element, which may not be available for the call, in some scenarios.

Figure 1E:
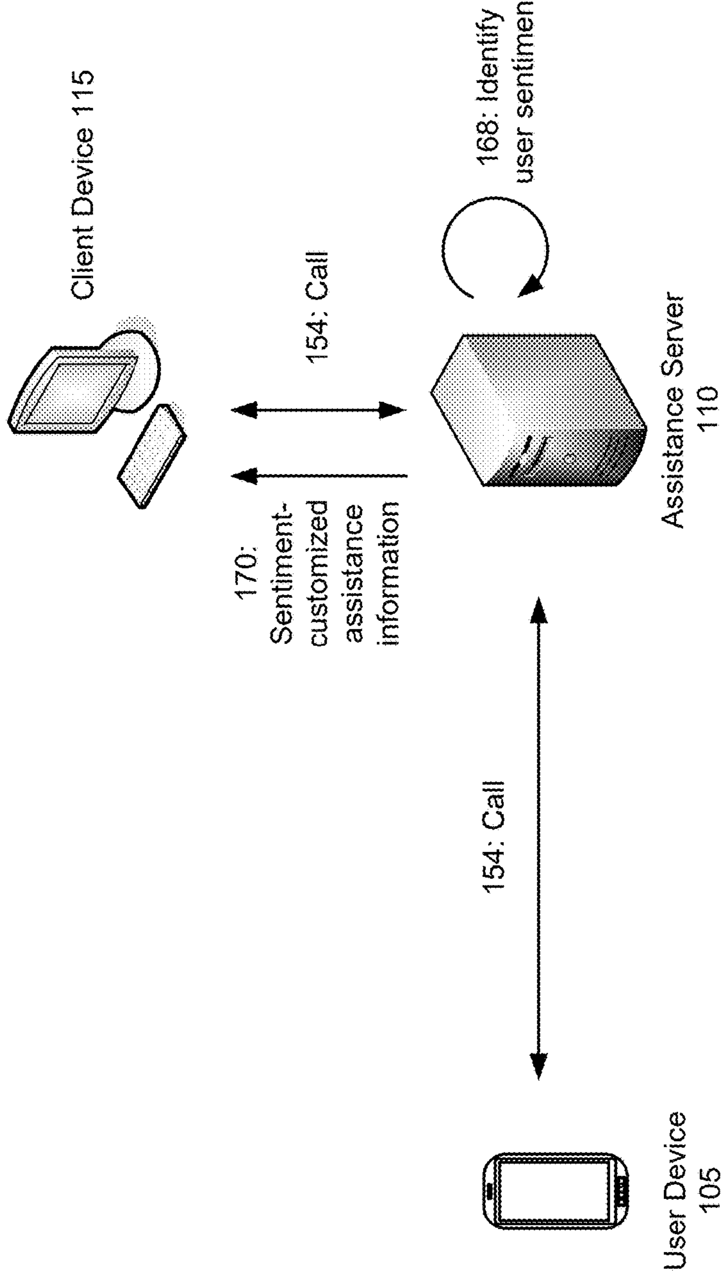

As shown in FIG. 1E, and by reference number 168, the assistance server 110 may identify a user sentiment associated with the call. For example, the assistance server 110 may monitor the call and determine a sentiment associated with a party to the call, such as a user of the user device 105. In this case, the assistance server 110 may adjust service information that is provided to the client device 115, as shown by reference number 170. For example, when the assistance server 110 determines a user to be frustrated in a customer service all, the assistance server 110 may automatically provide authorization to provide a discount to the user. Additionally, or alternatively, when the assistance server 110 determines that a telemedicine patient is stressed by testing being performed, the assistance server 110 may transmit information recommending one or more actions that a doctor can take to reduce a stress of the patient. In other words, by generating a metric representing a sentiment of a caller, the assistance server 110 can dynamically adjust a script (or generate new content for a script) being used by a party to the call (e.g., a script associated with an information flow), thereby reducing a likelihood of call failure, which can result in later, repetitive calls that waste system and/or organizational resources. For example, the assistance server 110 may use artificial intelligence to dynamically change the language of a script (e.g., to use shorter language if a user is frustrated or more simplistic language if a user is confused or expanded language if a user is well engaged), thereby customizing an information flow to a user sentiment, which increases a likelihood of a call successfully completing an information flow in an efficient manner. In this case, the assistance server 110 may transmit, to the client device 115, an instruction to replace first assistance information (e.g., a first script) with second assistance information (e.g., a second, dynamically updated script) in a user interface.

Figure 1F:
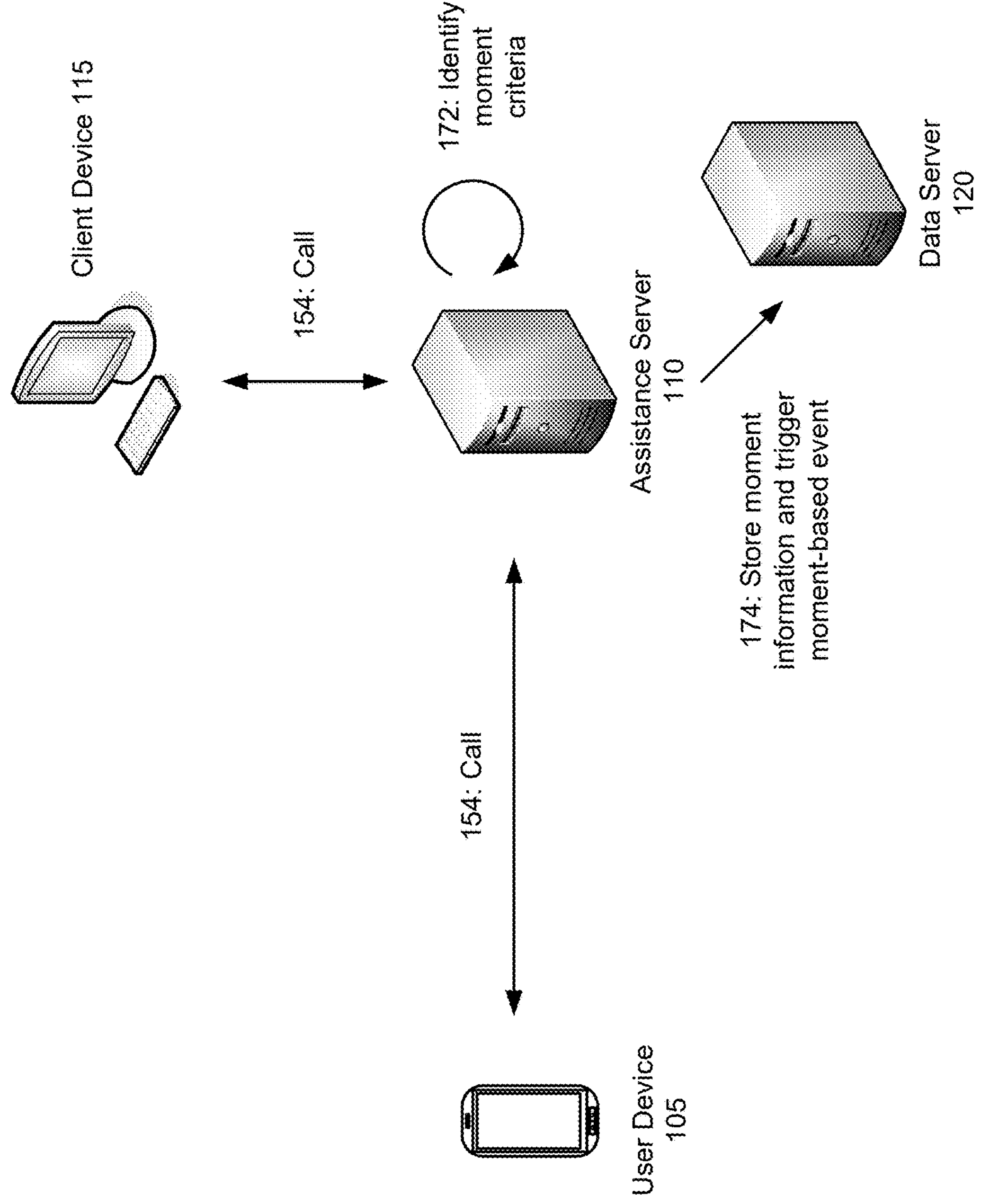

As shown in FIG. 1F, and by reference number 172, the assistance server 110 may identify that one or more moment criteria have been satisfied. For example, the assistance server 110 may analyze a sentiment or semantic content of a call to flag an interaction for follow-up via another call. In this case, the follow-up may include follow-up from another type of medical specialist (e.g., flagging a discussion of a skin issue for follow-up with a dermatologist), follow-up from a customer satisfaction team (e.g., flagging a lack of satisfaction with an outcome for follow-up from a team with authorization to provide special incentives to improve customer satisfaction), follow-up from a technical support specialist, or another type of follow-up. Accordingly, the assistance server 110 may store the moment information, as shown by reference number 174, and trigger a moment-based event. For example, the assistance server 110 may automatically connect another call or may transmit an instruction to add a calendar event for another call to a calendar of a user of the user device 105 and/or to a calendar of a client device of a follow-up specialist. In one particular example, the assistance server 110 may use an AI model of customer engagement to determine when to provide a special incentive, such as a discount, a free item, or an advertisement. The assistance server 110 may feed information, such as a particular level of user sentiment or a particular response to a question in an information flow into the AI model of customer engagement to generate a prediction regarding an effect of a particular incentive. Accordingly, the assistance server 110 may provide the particular incentive when the effect satisfies a threshold. By integrating moment-based events into calling, the assistance server 110 can increase a likelihood of successful engagement by using the moment-based events to improve customer satisfaction, thereby increasing a likelihood that the customer remains on the call to complete an information flow. By increasing a likelihood of the customer enabling completion of the information flow, the assistance server 110 reduces a likelihood of later, repetitive calls occurring (for another attempt to complete the information flow), thereby reducing a utilization of system resources (e.g., network resources or computing resources to complete other calls) and/or organizational resources (e.g., use of personnel time to complete other calls).

Figure 1G:
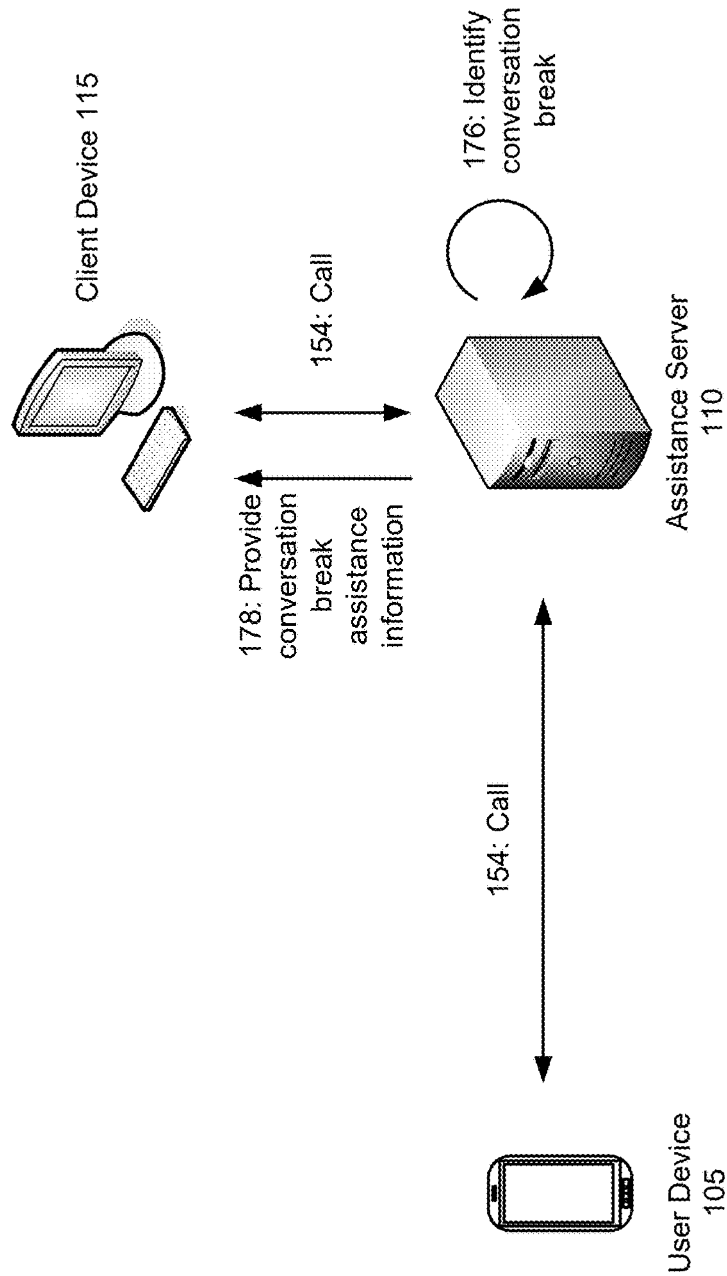

As shown in FIG. 1G, and by reference number 176, the assistance server 110 may identify a conversation break. For example, the assistance server 110 may identify a gap in a conversation, such as a gap associated with the assistance server 110 performing a backend task (e.g., a processing task, an information retrieval task, or a communication task) with parties to the call waiting for the assistance server 110 to finish the backend task and provide further information, a gap associated with a party to the call performing an action, or another type of gap. In this case, when a predicted time delay associated with the gap is predicted to exceed a time delay threshold, the assistance server 110 may provide conversation break or filler assistance information, as shown by reference number 178. For example, the assistance server 110 may provide a party to the call with prompts to enable interaction with another party to the call during the gap. Additionally, or alternatively, the assistance server 110 may provide content on the call, such as music, entertainment, a quiz, a customer service survey, or another type of content to fill the conversation break.

Figure 1H:
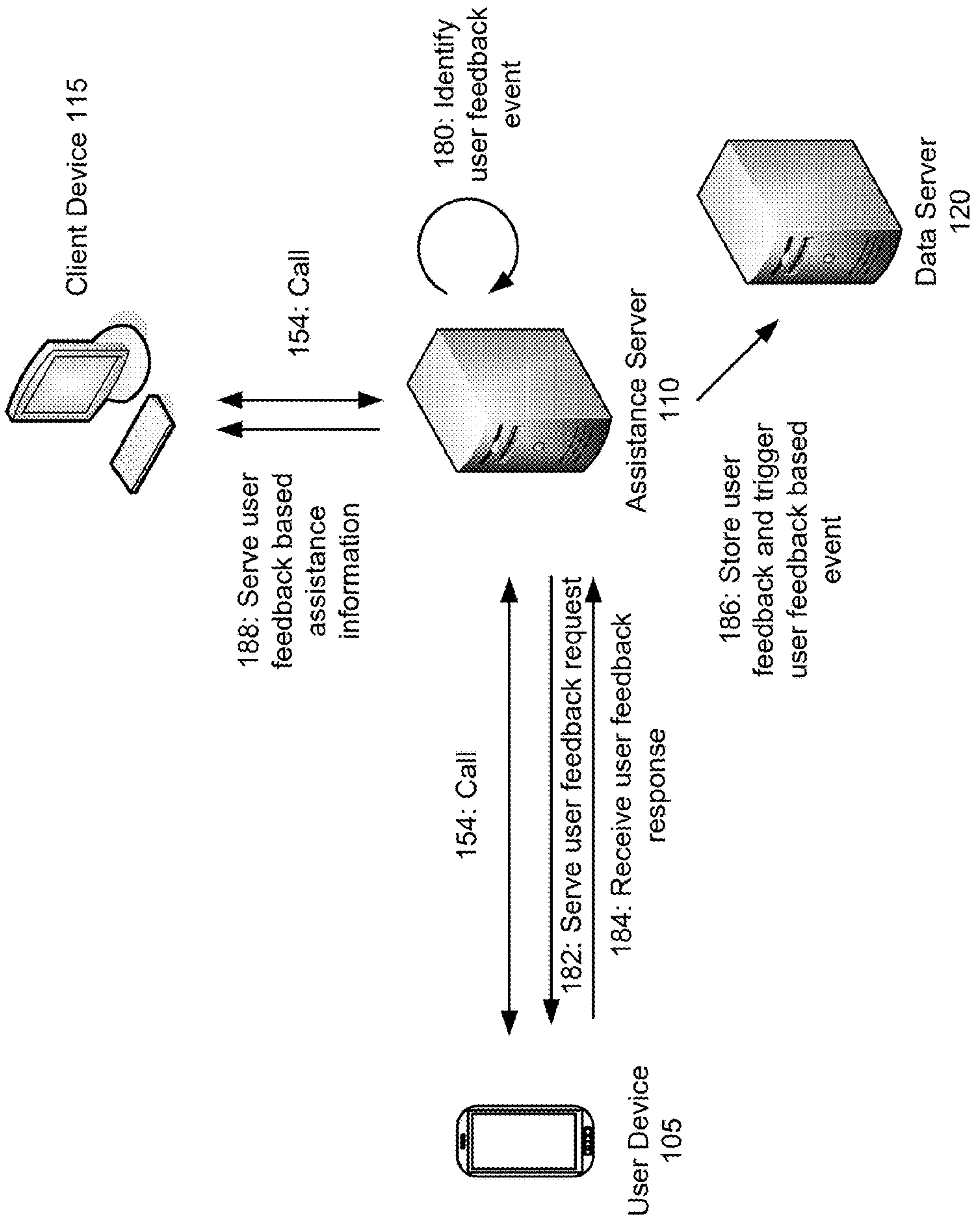

As shown in FIG. 1H, and by reference number 180, the assistance server 110 may identify a user feedback event. For example, the assistance server 110 may identify a scenario in which user feedback is to be obtained, such as completion of the call. In this case, as shown by reference numbers 182 and 184, the assistance server 110 may serve a user feedback request and receive a user feedback response. For example, the assistance server 110 may request that a user provide feedback via a textual channel and the assistance server 110 may log the feedback and/or trigger an event, such as using the feedback for retraining of an AI model that is being used by the assistance server 110, as shown by reference number 186. As shown by reference number 188, the assistance server 110 may serve user feedback based assistance information. For example, the assistance server 110 may transmit a report regarding the user feedback to the client device 115. Additionally, or alternatively, the assistance server 110 may dynamically update a script being provided via the client device 115 based on the user feedback.

In this way, the assistance server 110 provides a visual interface and advanced features to facilitate interactive and efficient communication between a user of the user device 105 and a user of the client device 115. By providing AI-based assistance for a communication, the assistance server 110 may improve customer experience, streamline call center operations, improve a likelihood of a successful call outcome (e.g., successful resolution of a technical support issue, successful diagnosis of a medical issue, or successful completion of an application form). Moreover, by improving a call efficiency (e.g., reducing a length of a call and/or increasing a likelihood of success of a call), the assistance server 110 improves functioning of systems that are subject to a call, reduces a utilization of resources to complete a call, and/or reduces resources that may be used to manually, and inefficiently complete a task.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
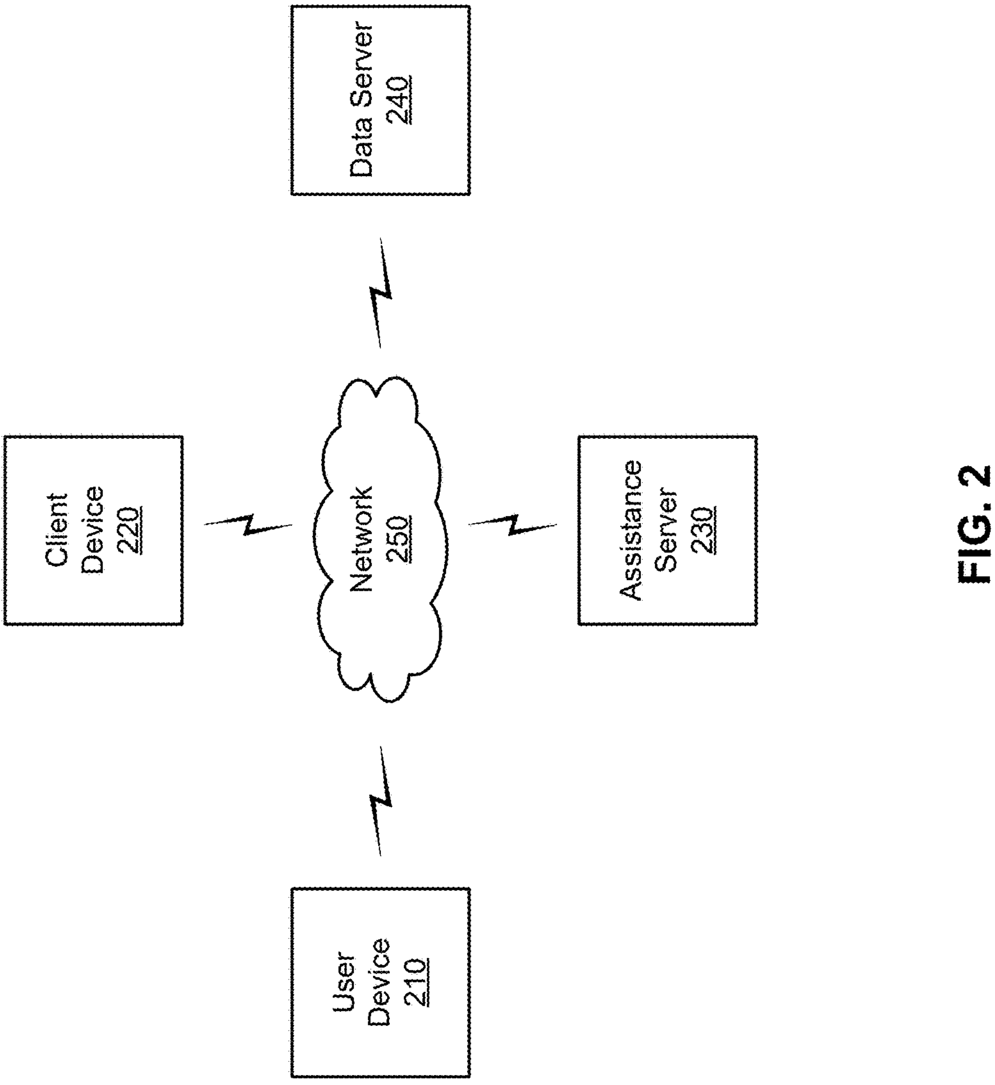
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a user device 210, a client device 220, an assistance server 230, a data server 240, and a network 250. Devices of environment 200 may interconnect via wired connections, wireless connections, or a combination of wired and wireless connections.

The user device 210 may include one or more devices capable of receiving, generating, storing, processing, and/or providing information associated with an interactive call, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 210 may correspond to the user device 105 of FIGS. 1A-1H.

The client device 220 may include one or more devices capable of receiving, generating, storing, processing, and/or providing information associated with an interactive call, as described elsewhere herein. The client device 220 may include a communication device and/or a computing device. For example, the client device 220 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the client device 220 may correspond to the client device 115 of FIGS. 1A-1H.

The assistance server 230 may include one or more devices capable of receiving, generating, storing, processing, providing, and/or routing information associated with AI-enhanced interactive calling, as described elsewhere herein. The assistance server 230 may include a communication device and/or a computing device. For example, the assistance server 230 may include a server, such as an application server, a client server, a web server, a database server, a host server, a proxy server, a virtual server (e.g., executing on computing hardware), or a server in a cloud computing system. In some implementations, the assistance server 230 may include computing hardware used in a cloud computing environment. In some implementations, the assistance server 230 may correspond to the assistance server 110 of FIGS. 1A-1H.

The data server 240 may include one or more devices capable of receiving, generating, storing, processing, and/or providing information associated with interactive calling, as described elsewhere herein. The data server 240 may include a communication device and/or a computing device. For example, the data server 240 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data server 240 may communicate with one or more other devices of environment 200, as described elsewhere herein. In some implementations, the data server 120 may correspond to the data server 120 of FIGS. 1A-1H.

The network 250 may include one or more wired and/or wireless networks. For example, the network 250 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 250 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
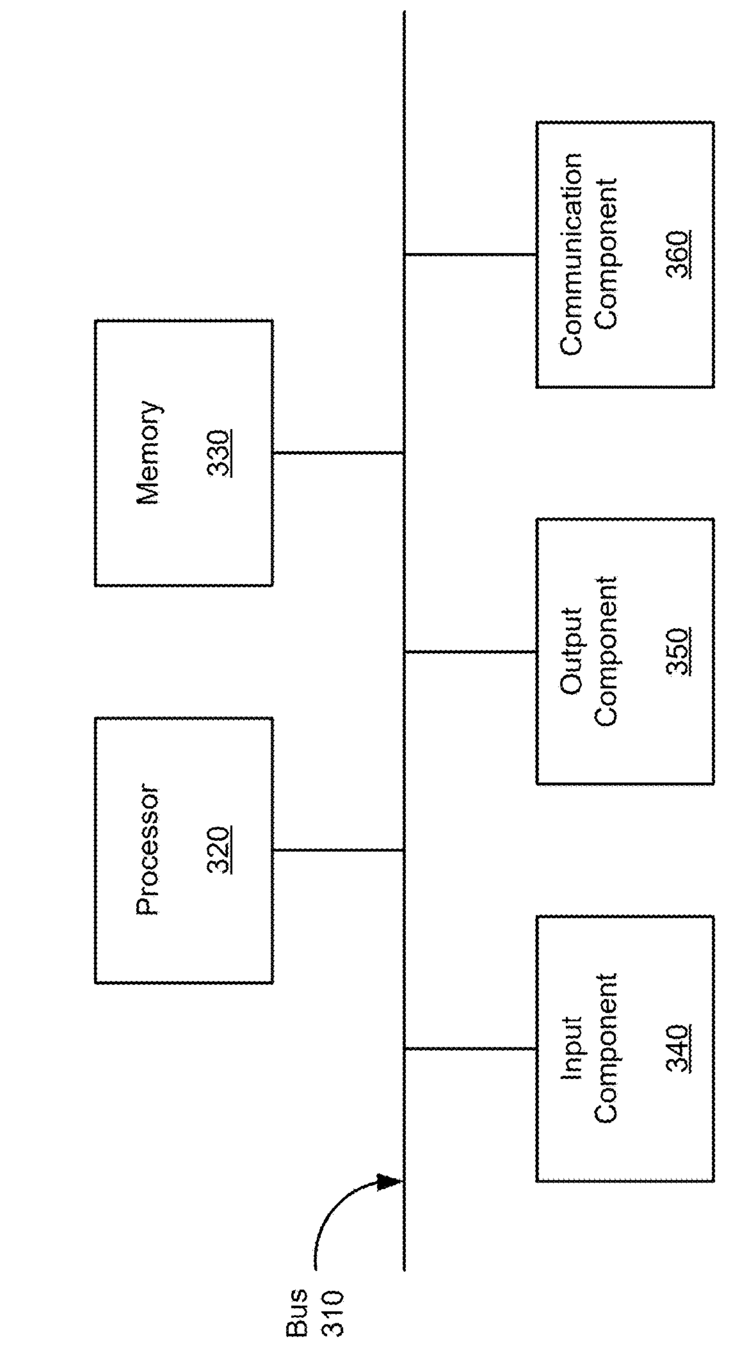
FIG. 3 is a diagram of example components of a device associated with interactive calling assistance system with artificial intelligence, in accordance with some embodiments of the present disclosure.

FIG. 3 is a diagram of example components of a device 300 associated with interactive calling assistance system with artificial intelligence. The device 300 may correspond to user device 210, client device 220, assistance server 230, and/or data server 240. In some implementations, user device 210, client device 220, assistance server 230, and/or data server 240 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
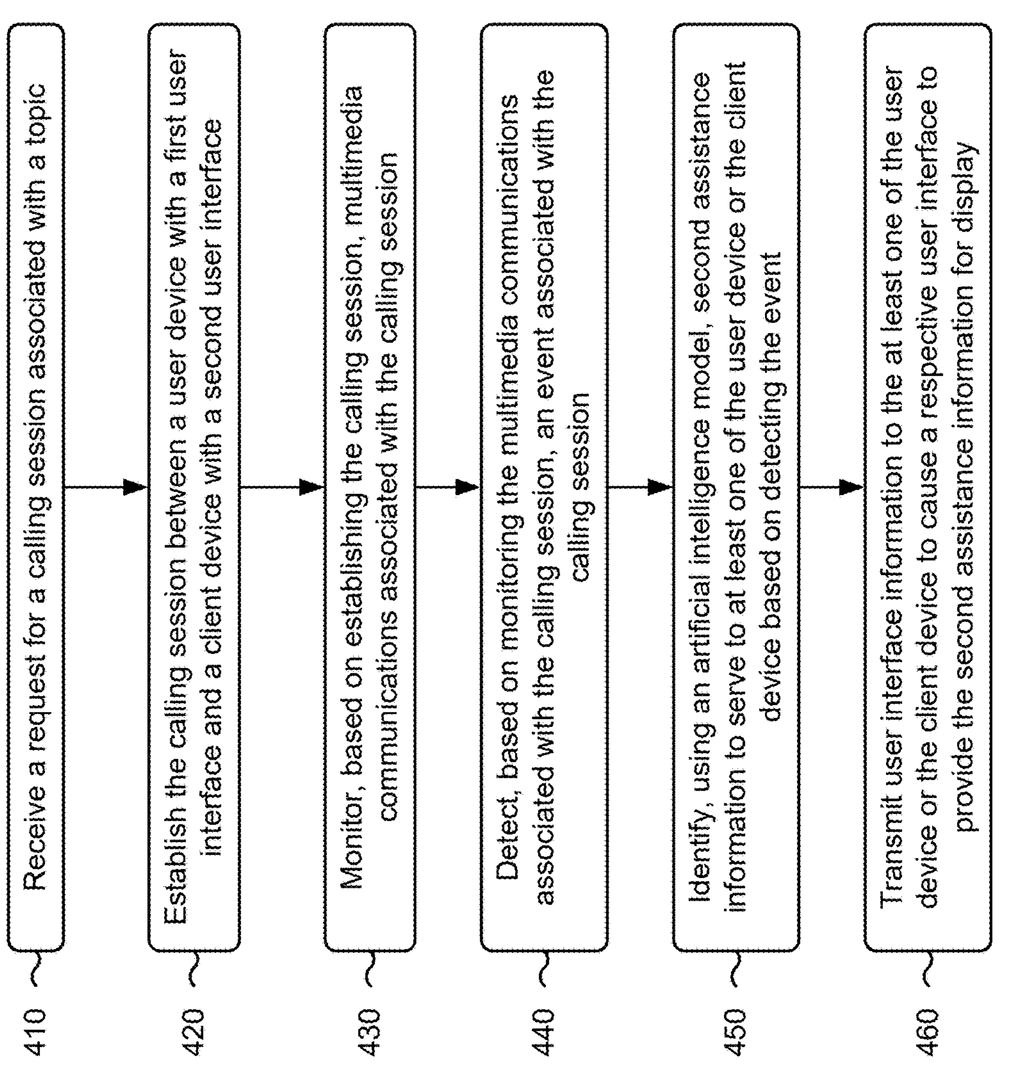
FIG. 4 is a flowchart of an example process associated with using an interactive calling assistance system with artificial intelligence, in accordance with some embodiments of the present disclosure.

FIG. 4 is a flowchart of an example process 400 associated with using an interactive calling assistance system with artificial intelligence. In some implementations, one or more process blocks of FIG. 4 may be performed by the assistance server 230. In some implementations, one or more process blocks of FIG. 4 may be performed by another device or a group of devices separate from or including the assistance server 230, such as the user device 210, the client device 220, and/or the data server 240. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request for a calling session associated with a topic (block 410). For example, the assistance server 230 (e.g., using processor 320, memory 330, input component 340, and/or communication component 360) may receive a request for a calling session associated with a topic, as described above in connection with reference number 150 of FIG. 1A. As an example, a user may use user device 210 to request a customer assistance call. The request may be routed to the assistance server 230 providing interactive calling and to the client device 220 being operated by a customer support representative.

As further shown in FIG. 4, process 400 may include establishing the calling session between a user device with a first user interface and a client device with a second user interface (block 420). For example, the assistance server 230 (e.g., using processor 320 and/or memory 330) may establish the calling session between a user device with a first user interface and a client device with a second user interface, as described above in connection with reference number 154 of FIG. 1B. As an example, the assistance server 230 may connect a call between the user device 210 and the client device 220 to enable a user to request assistance with a service, such as applying for a new credit card. In some implementations, the second user interface is provided with first assistance information associated with the topic, as described above in more detail by reference number 160 of FIG. 1C. For example, the assistance server 230 may provide service information associated with the service that the user and customer support representative are completing, such as information identifying steps for completing a request for a new credit card.

As further shown in FIG. 4, process 400 may include monitoring, based on establishing the calling session, multimedia communications associated with the calling session (block 430). For example, the assistance server 230 (e.g., using processor 320 and/or memory 330) may monitor, based on establishing the calling session, multimedia communications associated with the calling session, as described above in connection with reference number 162 of FIG. 1D. As an example, the assistance server 230 may monitor audio, video, or text chat associated with a call to attempt to detect events for which assistance information can be provided.

As further shown in FIG. 4, process 400 may include detecting, based on monitoring the multimedia communications associated with the calling session, an event associated with the calling session (block 440). For example, the assistance server 230 (e.g., using processor 320 and/or memory 330) may detect, based on monitoring the multimedia communications associated with the calling session, an event associated with the calling session, as described above in connection with reference number 162 of FIG. 1D. As an example, the assistance server 230 may detect that a customer support representative has reached a step of a process in which the user is to confirm a privacy policy. As another example, the assistance server 230 may detect that the customer support representative has requested that the user provide secure information, such as a social security number or password, such as based on a correlation between a transcription of the call and a position within a QA checklist that is associated with communication of secure information.

As further shown in FIG. 4, process 400 may include identifying, using an artificial intelligence model, second assistance information to serve to at least one of the user device or the client device based on detecting the event (block 450). For example, the assistance server 230 (e.g., using processor 320 and/or memory 330) may identify, using an artificial intelligence model, second assistance information to serve to at least one of the user device or the client device based on detecting the event, as described above in connection with reference number 162 of FIG. 1D. As an example, the assistance server 230 may identify a user interface element to server to the user device 210 for display, such as a button to allow a user to confirm provided information or a text box with which to receive secure information that the user is to provide.

As further shown in FIG. 4, process 400 may include transmitting user interface information to the at least one of the user device or the client device to cause a respective user interface to provide the second assistance information for display (block 460). For example, the assistance server 230 (e.g., using processor 320, memory 330, and/or communication component 360) may transmit user interface information to the at least one of the user device or the client device to cause a respective user interface to provide the second assistance information for display, as described above in connection with reference number 164 of FIG. 1D. As an example, the assistance server 230 may cause a user interface element to be provided for display by the user device 210 to allow a user to interact with the user interface element, thereby facilitating the call with the customer service representative.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1H. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for interactive calling, the system comprising:
one or more memories; and
one or more processors, communicatively coupled to the one or more memories, configured to:
receive a request for a calling session associated with a topic;
establish the calling session between a user device with a first user interface and a client device with a second user interface,
wherein the second user interface is provided with first assistance information associated with the topic;
monitor, based on establishing the calling session, multimedia communications associated with the calling session;
detect, based on monitoring the multimedia communications associated with the calling session, an event associated with the calling session,
wherein detecting the event comprises determining that a backend task is associated with a predicted time delay that satisfies a time delay threshold;
identify, using an artificial intelligence model, second assistance information to serve to at least one of the user device or the client device based on detecting the event; and
transmit user interface information to the at least one of the user device or the client device to cause a respective user interface to provide the second assistance information for display,
wherein transmitting the user interface information comprises transmitting an instruction to provide filler assistance information associated with the predicted time delay.

2. The system of claim 1, wherein the one or more processors, to generate the second assistance information, are configured to:
generate a transcription of the multimedia communications; and
wherein the one or more processors, to transmit the user interface information, are configured to:
transmit an instruction to provide the transcription for display via at least one of the first user interface or the second user interface.

3. The system of claim 1, wherein the one or more processors, to detect the event, are configured to:
generate a sentiment analysis value for the calling session; and
wherein the one or more processors, to transmit the user interface information, are configured to:
transmit an instruction to replace at least a portion of the first assistance information with the second assistance information, the second assistance information being based on the sentiment analysis value.

4. The system of claim 1, wherein the first assistance information includes a quality assurance (QA) template for the topic; and
wherein the one or more processors, to transmit the user interface information, are configured to:
transmit an instruction to synchronize the second user interface with a detected position within the QA template, the detected position within the QA template being based on the event.

5. The system of claim 4, wherein the one or more processors are further configured to:
detect a deviation from the QA template;
identify a corrective instruction for the client device based on detecting the deviation from the QA template; and
transmit another instruction to the client device to provide the corrective instruction.

6. The system of claim 1, wherein the one or more processors, to transmit the user interface information, are configured to:
transmit an instruction to provide a feedback request for display via the first user interface; and
wherein the one or more processors are further configured to:
receive a feedback response from the user device based on transmitting the instruction to provide the feedback request for display; and
transmit an instruction to the client device to provide additional assistance information for display via the second user interface based on receiving the feedback response.

7. The system of claim 1, wherein the backend task is at least one of:
a processing task,
an information retrieval task, or
a communication task.

8. The system of claim 1, wherein the one or more processors, to generate the assistance information, are configured to:
receive user data associated with a user of the user device; and
generate the filler assistance information based on the user data.

9. A non-transitory computer-readable medium storing a set of instructions, the set of instructions comprising:
one or more instructions that, when executed by one or more processors of a device, cause the device to:
receive a request for a calling session associated with a topic;
establish the calling session between a user device with a first user interface and a client device with a second user interface,
wherein the second user interface is provided with first assistance information associated with the topic;
monitor, based on establishing the calling session, multimedia communications associated with the calling session;
detect, based on monitoring the multimedia communications associated with the calling session, an event associated with the calling session,
wherein detecting the event comprises determining that a backend task is associated with a predicted time delay that satisfies a time delay threshold;
identify, using an artificial intelligence model, second assistance information to serve to at least one of the user device or the client device based on detecting the event; and
transmit user interface information to the at least one of the user device or the client device to cause a respective user interface to provide the second assistance information for display, wherein transmitting the user interface information comprises transmitting an instruction to provide filler assistance information associated with the predicted time delay.

10. The non-transitory computer-readable medium of claim 9, wherein the one or more instructions, that cause the device to generate the second assistance information, cause the device to:

generate a transcription of the multimedia communications; and wherein the one or more instructions, that cause the device to transmit the user interface information, cause the device to:

transmit an instruction to provide the transcription for display via at least one of the first user interface or the second user interface.

11. The non-transitory computer-readable medium of claim 9, wherein the one or more instructions, that cause the device to detect the event, cause the device to:

generate a sentiment analysis value for the calling session; and wherein the one or more instructions, that cause the device to transmit the user interface information, cause the device to:

transmit an instruction to replace at least a portion of the first assistance information with the second assistance information, the second assistance information being based on the sentiment analysis value.

12. The non-transitory computer-readable medium of claim 9, wherein the first assistance information includes a quality assurance (QA) template for the topic; and wherein the one or more instructions, that cause the device to transmit the user interface information, cause the device to:

transmit an instruction to synchronize the second user interface with a detected position within the QA template, the detected position within the QA template being based on the event.

13. The non-transitory computer-readable medium of claim 12, wherein the one or more instructions further cause the device to:

detect a deviation from the QA template;

identify a corrective instruction for the client device based on detecting the deviation from the QA template; and transmit another instruction to the client device to provide the corrective instruction.

14. The non-transitory computer-readable medium of claim 9, wherein the one or more instructions, that cause the device to transmit the user interface information, cause the device to:

transmit an instruction to provide a feedback request for display via the first user interface; and wherein the one or more instructions further cause the device to:

receive a feedback response from the user device based on transmitting the instruction to provide the feedback request for display; and transmit an instruction to the client device to provide additional assistance information for display via the second user interface based on receiving the feedback response.

15. The non-transitory computer-readable medium of claim 9, wherein the backend task is at least one of:

a processing task, an information retrieval task, or a communication task.

16. The non-transitory computer-readable medium of claim 9, wherein the one or more instructions, that cause the device to generate the assistance information, cause the device to:

receive user data associated with a user of the user device; and generate the filler assistance information based on the user data.

17. A method, comprising:

receiving, by a device, a request for a calling session associated with a topic;

establishing, by the device, the calling session between a user device with a first user interface and a client device with a second user interface, wherein the second user interface is provided with first assistance information associated with the topic;

monitoring, based on establishing the calling session, multimedia communications associated with the calling session;

detecting, based on monitoring the multimedia communications associated with the calling session, an event associated with the calling session, wherein detecting the event comprises determining that a backend task is associated with a predicted time delay that satisfies a time delay threshold;

identifying, using an artificial intelligence model, second assistance information to serve to at least one of the user device or the client device based on detecting the event; and transmitting, by the device, user interface information to the at least one of the user device or the client device to cause a respective user interface to provide the second assistance information for display, wherein transmitting the user interface information comprises transmitting an instruction to provide filler assistance information associated with the predicted time delay.

18. The method of claim 17, wherein generating the second assistance information comprises:

generating a transcription of the multimedia communications; and wherein transmitting the user interface information comprises:

transmitting an instruction to provide the transcription for display via at least one of the first user interface or the second user interface.

* * * * *